United States Patent
Liang et al.

(10) Patent No.: US 12,477,258 B2
(45) Date of Patent: Nov. 18, 2025

(54) COMMUNICATION METHOD AND APPARATUS

(71) Applicant: HUAWEI TECHNOLOGIES CO., LTD., Shenzhen (CN)

(72) Inventors: Bo Liang, Shenzhen (CN); Jinliang Ge, Chengdu (CN); Yi Lin, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 263 days.

(21) Appl. No.: 18/328,127

(22) Filed: Jun. 2, 2023

(65) Prior Publication Data

US 2023/0308788 A1 Sep. 28, 2023

Related U.S. Application Data

(63) Continuation of application No. PCT/CN2021/135132, filed on Dec. 2, 2021.

(30) Foreign Application Priority Data

Dec. 4, 2020 (CN) .......................... 202011409880.X (51) Int. Cl.
*H04Q 11/00* (2006.01)
*H04J 3/16* (2006.01)
*H04W 74/08* (2024.01)

(52) U.S. Cl.
CPC ........ *H04Q 11/0066* (2013.01); *H04J 3/1658* (2013.01); *H04J 2203/0098* (2013.01);
(Continued)

(58) Field of Classification Search
CPC ................................................. H04W 74/0866
See application file for complete search history.

(56) References Cited

U.S. PATENT DOCUMENTS

2014/0178073 A1 6/2014 Katagiri
2021/0144516 A1* 5/2021 Kim .................... H04W 72/046
(Continued)

FOREIGN PATENT DOCUMENTS

| CN | 101237403 A | 8/2008 |
| CN | 104038443 A | 9/2014 |
| CN | 106506110 A | 3/2017 |

OTHER PUBLICATIONS

Chinese Office Action issued in corresponding Chinese Application No. 202011409880.X, dated Mar. 28, 2023, pp. 1-5.
(Continued)

*Primary Examiner* — Shi K Li
(74) *Attorney, Agent, or Firm* — HAUPTMAN HAM, LLP (57) ABSTRACT

This application discloses a communication method and apparatus, which belong to the communication field and are used for data frame transmission. The method is applied to a transit node of a communication system, and the method includes: receiving a data frame, where the data frame includes a bandwidth exclusive channel number, and the data frame is an optical transport network data frame or a microwave data frame; when the bandwidth exclusive channel number carried in the data frame is a preset bandwidth exclusive channel number, obtaining scheduling information and a sink node address from the data frame; and scheduling the data frame based on the scheduling information, and forwarding the data frame to a sink node indicated by the sink node address. In this application, bandwidth utilization of the bandwidth exclusive channel is improved.

20 Claims, 4 Drawing Sheets

(52) U.S. Cl.
CPC ........... *H04Q 2011/0064* (2013.01); *H04Q 2011/0079* (2013.01)

(56) References Cited

U.S. PATENT DOCUMENTS

2022/0408506 A1* 12/2022 Kim .................. H04W 28/20
2024/0064786 A1*  2/2024 Jin .................... H04W 76/15

OTHER PUBLICATIONS

Huawei Tech (UK) Co et al:"Huawei_Contribution_IP Hardpipe_for_Critical_Services", ETSI Draft; RT(17) 066037, European Telecommunications Standards Institute (ETSI), 650, Route Des Lucioles; F-06921 Sophiaantipolis; France, vol. TC-RT—Railway telecommunications Jul. 3, 2017 (Jul. 3, 2017), pp. 1-14, XP014297358.
Kamoun Faouzi et al: "IP/MPLS networks with hardened pipes: service concepts, traffic engineering and design considerations", Journal of Ambient Intelligence and Humanized Computing. Springer Berlin Heidelberg. Berlin/Heidelberg. vol. 10. No. 7. Mar. 3, 2018 (Mar. 3, 2018), pp. 2577-2584, XP036796310.
Extended European Search Report issued in corresponding European Application No. 21900073.4, dated Apr. 3, 2024, pp. 1-10.

* cited by examiner

COMMUNICATION METHOD AND APPARATUS

CROSS-REFERENCE TO RELATED APPLICATIONS

This application is a continuation of International Application No. PCT/CN2021/135132, filed on Dec. 2, 2021, which claims priority to Chinese Patent Application No. 202011409880.X, filed on Dec. 4, 2020. The disclosures of the aforementioned applications are hereby incorporated by reference in their entireties.

TECHNICAL FIELD

This application relates to the communication field, and in particular, to a communication method and apparatus.

BACKGROUND

In a current communication system, for example, an optical transport network (OTN), a bandwidth exclusive channel technology (also referred to as a hard pipe technology) is provided. The bandwidth exclusive channel technology is to establish an end-to-end communication connection for a dedicated service of a communication system and allocate an independent bandwidth to the dedicated service. The communication connection is referred to as a bandwidth exclusive channel (or a hard pipe), and a unique bandwidth exclusive channel number is allocated to each bandwidth exclusive channel Service data of the dedicated service carries the bandwidth exclusive channel number during transmission. A forwarding node forwards the service data of the dedicated service by using an independent bandwidth based on the bandwidth exclusive channel number, so as to ensure that the dedicated service is not interfered with by a common service.

However, with development of services such as the Internet of Things, the services have an increasingly high requirement on a full connection (namely, a ubiquitous connection). However, a communication system has a limited quantity of bandwidth exclusive channels, and each bandwidth exclusive channel supports only end-to-end service data transmission. Consequently, bandwidth utilization of the bandwidth exclusive channel is low.

SUMMARY

Embodiments of this application provide a communication method and apparatus, to improve bandwidth utilization of a bandwidth exclusive channel.

According to a first aspect, a communication method is provided and is applied to a transit node (also referred to as an intermediate node, an intermediate device, or a transit device) of a communication system. The method includes: receiving a data frame, where the data frame includes a bandwidth exclusive channel number, and the data frame is an OTN data frame or a microwave data frame (also referred to as a microwave data unit); when the bandwidth exclusive channel number carried in the data frame is a preset bandwidth exclusive channel number, obtaining scheduling information and a sink node address from the data frame; and scheduling the data frame based on the scheduling information, and forwarding the data frame to a sink node indicated by the sink node address.

In this embodiment of this application, the transit node may schedule, based on the scheduling information, different data frames in a bandwidth exclusive channel indicated by the preset bandwidth exclusive channel number. Data frames are transmitted between different source nodes and different sink nodes in a same bandwidth exclusive channel, so that the bandwidth exclusive channel supports statistical multiplexing. This improves bandwidth utilization of the bandwidth exclusive channel.

Optionally, a process of forwarding the data frame to the sink node indicated by the sink node address includes: querying a correspondence between the sink node address and an outbound interface, to obtain a target outbound interface corresponding to the sink node address carried in the data frame; and sending the scheduled data frame from the target outbound interface.

When the data frame includes the preset bandwidth exclusive channel number, the data frame further includes preset congestion levels. Different congestion levels correspond to different congestion degrees. In this way, in the communication system, no dedicated control message is needed to transmit the preset congestion levels, thereby reducing communication overheads. In this embodiment of this application, the transit node may further perform flow control and backpressure based on the obtained preset congestion levels. The flow control and backpressure refers to traffic control of data frames through feedback. A process of the flow control and backpressure includes: if a congestion degree of a data frame queue of the transit node reaches a target congestion level in the preset congestion levels, sending the target congestion level to an upstream node of the transit node. The target congestion level is used for the upstream node to control a quantity of sent data frames. For example, the quantity of the sent data frames is maintained or reduced.

In a first optional manner, the upstream node of the transit node is a previous-hop node of the transit node. The transit node feeds back the target congestion level to the previous-hop node, and then the previous-hop node feeds back the target congestion level to a previous-hop node of the previous-hop node until the target congestion level is fed back to a source node, thereby implementing hop-by-hop forward feedback of the target congestion level. When the target congestion level indicates that congestion occurs on the transit node, each node that receives the target congestion level may reduce, based on the target congestion level, a quantity of sent data frames, so as to reduce a quantity of data frames arriving at the transit node, thereby reducing congestion of the data frame queue of the transit node.

In a second optional manner, the upstream node of the transit node is a source node, and the transit node directly feeds back the target congestion level to the source node. When the target congestion level indicates that congestion occurs on the transit node, the source node may reduce, based on the target congestion level, a quantity of sent data frames, so as to reduce a quantity of data frames arriving at the transit node, thereby reducing congestion of the data frame queue of the transit node.

Compared with the second optional manner, the first optional manner has a smaller delay in reducing the congestion level. However, each node between the transit node and the source node needs to react, and a process of performing the flow control and backpressure is more complex. In the second optional manner, because the source node directly reduces a quantity of the data frames at the source, a process of performing the flow control and backpressure is simpler.

The bandwidth exclusive channel corresponding to the preset bandwidth exclusive channel number has an exclusive bandwidth. The transit node schedules the data frame based on the exclusive bandwidth. For example, a quantity of data frames sent by the transit node in a unit time is less than the bandwidth of the bandwidth exclusive channel. There are a plurality of manners for the transit node to obtain the bandwidth of the preset bandwidth exclusive channel. In this embodiment of this application, the following two manners are used as examples for description. In a first manner, the transit node determines a sum of remaining bandwidths of other bandwidth exclusive channels as the bandwidth of the preset bandwidth exclusive channel. The other bandwidth exclusive channels are bandwidth exclusive channels other than the preset bandwidth exclusive channel in the communication system. In a second manner, the transit node receives a bandwidth setting instruction, and determines, based on the bandwidth setting instruction, the bandwidth of the preset bandwidth exclusive channel.

According to a second aspect, a communication method is provided and is applied to a source node of a communication system. The method includes: The source node generates an optical transport network data frame, where the data frame is an OTN data frame or a microwave data frame, the data frame includes a preset bandwidth exclusive channel number, a sink node address, and scheduling information, and the data frame is used for a next-hop node of the source node to schedule the data frame based on the scheduling information after determining that the data frame carries the preset bandwidth exclusive channel number, and forward the data frame to a sink node indicated by the sink node address; and the source node forwards the data frame. Optionally, the data frame further includes a source node address of the source node.

A bandwidth exclusive channel corresponding to the preset bandwidth exclusive channel number has an exclusive bandwidth. The source node sends the data frame based on the exclusive bandwidth. For example, a quantity of data frames sent by the source node in a unit time is less than the bandwidth of the bandwidth exclusive channel. For a manner of obtaining the bandwidth of the preset broadband exclusive channel by the source node, refer to the manner of obtaining the bandwidth of the bandwidth exclusive channel by the transit node.

According to a third aspect, a communication method is provided and is applied to a sink node of a communication system. The method includes: The sink node receives a data frame, where the data frame is an OTN data frame or a microwave data frame, the data frame includes a preset bandwidth exclusive channel number, a sink node address of the sink node, and scheduling information, and the data frame is used for a transit node between a source node and the sink node to schedule the data frame based on the scheduling information after determining that the data frame carries the preset bandwidth exclusive channel number, and forward the data frame to the sink node indicated by the sink node address; and the sink node parses the data frame.

The data frame further includes a source node address. The sink node needs to separately parse data frames from different source nodes. For example, a process of parsing the data frame by the sink node includes: the sink node allocates a packetizer to each received data frame, for example, allocates different packetizers to different source node addresses; and the sink node parses data frames from a same source node address by using an allocated packetizer. For example, the sink node parses a source node address and a sink node address in each data frame, and determines data frames whose source node addresses and sink node addresses are correspondingly the same as a same data stream. The data stream includes data frames from a same source node address. The sink node allocates a packetizer to each data stream. In this way, packetizer allocation is implemented.

For example, when the data frame is an OSU, and a payload area of the OSU carries sliced service data. For OSUs from a same source node address, the sink node may strip an overhead area of each OSU, and splice service data carried in payload areas, where spliced service data is completed service data.

A bandwidth exclusive channel corresponding to the preset bandwidth exclusive channel number has an exclusive bandwidth. The sink node receives the data frame based on the exclusive bandwidth. For example, a quantity of data frames received by the sink node in a unit time is less than the bandwidth of the bandwidth exclusive channel. For a manner of obtaining the bandwidth of the preset broadband exclusive channel by the sink node, refer to the manner of obtaining the bandwidth of the bandwidth exclusive channel by the transit node.

With reference to the first aspect, the second aspect, or the third aspect, in an optional implementation, the scheduling information includes a transmission priority and/or a drop priority. The transmission priority indicates a sequence in which the data frame is scheduled by the transit node, and the drop priority indicates a sequence in which the data frame is dropped by the transit node.

With reference to the first aspect, the second aspect, or the third aspect, in another optional implementation, when the data frame includes the preset bandwidth exclusive channel number, the data frame further includes operation and maintenance information. The operation and maintenance information is for identifying a node that the data frame passes through and/or a hop count of a node that the data frame passes through during transmission. For example, the operation and maintenance information includes time to live (TTL).

With reference to the first aspect, the second aspect, or the third aspect, in still another optional implementation, when the data frame includes the preset bandwidth exclusive channel number, an overhead area of the data frame carries the bandwidth exclusive channel number, a source node address, the sink node address, and the scheduling information, and a payload area of the data frame carries sliced service data.

According to a fourth aspect, this application provides a communication apparatus. The communication apparatus may include at least one module, and the at least one module may be configured to perform the communication method according to the first aspect or any possible implementation of the first aspect.

According to a fifth aspect, this application provides a communication apparatus. The communication apparatus may include at least one module, and the at least one module may be configured to perform the execution communication method according to the second aspect or the possible implementations of the second aspect.

According to a sixth aspect, this application provides a communication apparatus. The communication apparatus may include at least one module, and the at least one module may be configured to perform the execution communication method according to the third aspect or the possible implementations of the third aspect.

According to a seventh aspect, this application provides a computer device. The computer device includes a processor and a memory. The memory stores computer instructions. The processor executes the computer instructions stored in the memory, to enable the computer device to perform the method according to the first aspect or any possible implementation of the first aspect; or to enable the computer device to perform the method according to the second aspect or any possible implementation of the second aspect; or to enable the computer device to perform the method according to the third aspect or any possible implementation of the third aspect.

According to an eighth aspect, this application provides a computer-readable storage medium. The computer-readable storage medium stores computer instructions. The computer instructions instruct a computer device to perform the method according to the first aspect or any possible implementation of the first aspect; or instruct the computer device to perform the method according to the second aspect or any possible implementation of the second aspect; or instruct the computer device to perform the method according to the third aspect or any possible implementation of the third aspect.

According to a ninth aspect, this application provides a computer program product. The computer program product includes computer instructions, and the computer instructions are stored in a computer-readable storage medium. A processor of a computer device may read the computer instructions from the computer-readable storage medium. The processor executes the computer instructions, to enable the computer device to perform the method according to the first aspect or any possible implementation of the first aspect; or to enable the computer device to perform the method according to the second aspect or any possible implementation of the second aspect; or to enable the computer device to perform the method according to the third aspect or any possible implementation of the third aspect.

According to a tenth aspect, this application provides a communication apparatus, used in a transit node of a communication system. The apparatus includes a processing chip and a transceiver. The processing chip is configured to perform any communication method according to the first aspect. The transceiver is configured for the processing chip to communicate with another apparatus.

According to an eleventh aspect, this application provides a communication apparatus, used in a source node of a communication system. The apparatus includes a processing chip and a transceiver. The processing chip is configured to perform any communication method according to the second aspect. The transceiver is configured for the processing chip to communicate with another apparatus.

According to a twelfth aspect, this application provides a communication apparatus, used in a sink node of a communication system. The apparatus includes a processing chip and a transceiver. The processing chip is configured to perform any communication method according to the third aspect. The transceiver is configured for the processing chip to communicate with another apparatus.

For example, the transceiver in the tenth aspect to the twelfth aspect may be an optical transceiver.

According to a thirteenth aspect, this application provides a communication system. The communication system includes a plurality of source nodes, a transit node, and a plurality of sink nodes. The transit node includes the communication apparatus in the tenth aspect, and the source nodes include the communication apparatus in the eleventh aspect. Optionally, the sink nodes include the communication apparatus in the twelfth aspect. Alternatively, the transit node includes the communication apparatus in the third aspect, and the source nodes include the communication apparatus in the fourth aspect. Optionally, the sink nodes include the communication apparatus in the fifth aspect.

According to a fourteenth aspect, this application provides a communication apparatus, used in a transit node of a communication system. The apparatus includes a processing chip and a communication interface. The processing chip is configured to perform any communication method according to the first aspect. The communication interface is configured for the processing chip to communicate with another apparatus.

According to a fifteenth aspect, this application provides a communication apparatus, used in a source node of a communication system. The apparatus includes a processing chip and a communication interface. The processing chip is configured to perform any communication method according to the second aspect. The communication interface is configured for the processing chip to communicate with another apparatus. Alternatively, the processing chip is configured to perform any communication method according to the third aspect, and the communication interface is configured for the processing chip to communicate with another apparatus.

According to a sixteenth aspect, a chip is provided. The chip may include a programmable logic circuit and/or program instructions. When the chip runs, the chip is configured to perform any communication method according to the first aspect. Alternatively, when the chip runs, the chip is configured to perform any communication method according to the second aspect. Alternatively, when the chip runs, the chip is configured to perform any communication method according to the third aspect.

In embodiments of this application, the transit node may schedule, based on the scheduling information, different data frames in a bandwidth exclusive channel indicated by the preset bandwidth exclusive channel number. Data frames are transmitted between different source nodes and different sink nodes in a same bandwidth exclusive channel, so that the bandwidth exclusive channel supports statistical multiplexing. This improves bandwidth utilization of the bandwidth exclusive channel.

DESCRIPTION OF EMBODIMENTS

To make principles and technical solutions of this application clearer, the following further describes implementations of this application in detail with reference to the accompanying drawings.

In a conventional OTN, a bandwidth exclusive channel technology is provided. In a communication system that uses the bandwidth exclusive channel technology, an end-to-end communication connection is established for a dedicated service, and an independent bandwidth is allocated to the dedicated service. The communication connection is a bandwidth exclusive channel. A bandwidth exclusive channel of an OTN provided in a related technology includes a source node, a sink node, and one or more transit nodes. The source node is configured to generate an OTN data frame, and forward the OTN data frame to the sink node via the transit node. The sink node is configured to parse the received OTN data frame. The OTN data frame includes a bandwidth exclusive channel number, indicating a bandwidth exclusive channel.

A source node and a sink node of each bandwidth exclusive channel are known, and therefore an OTN data frame does not include any source node address or sink node address. In the related technology, the OTN data frame may be an optical service unit frame, which is also referred to as an optical service unit (OSU). Service data is encapsulated in the OSU and then encapsulated in an optical channel data unit (ODU) for transmission. The OSU carries a bandwidth exclusive channel number. A cross-connection table is configured in the transit node. The cross-connection table records egress slots, egress bandwidth exclusive channel numbers, and egress ODU identifiers corresponding to different ingress slots, ingress bandwidth exclusive channel numbers, and ingress ODU identifiers. After receiving the OSU encapsulated in the ODU, the transit node uses an input slot of the OSU as the ingress slot, uses the bandwidth exclusive channel number carried in the OSU as the ingress bandwidth exclusive channel number, and uses an identifier of the ODU where the OSU is located as the ingress ODU identifier. The transit node queries the cross-connection table to obtain the egress slot, the egress bandwidth exclusive channel number, and the egress ODU identifier. The transit node updates the bandwidth exclusive channel number carried in the OSU to the egress bandwidth exclusive channel number, updates the identifier of the ODU where the OSU is located to the egress ODU identifier, and sends the updated OSU from the egress slot. The foregoing manner in which the transit node sends the OTN data frame is referred to as a cross-connection manner.

The transit node forwards the service data of the dedicated service by using the independent bandwidth, thereby ensuring that the dedicated service is not interfered with by a common service. However, each bandwidth exclusive channel supports only end-to-end service data transmission, resulting in low bandwidth utilization of the bandwidth exclusive channel.

Figure 1:
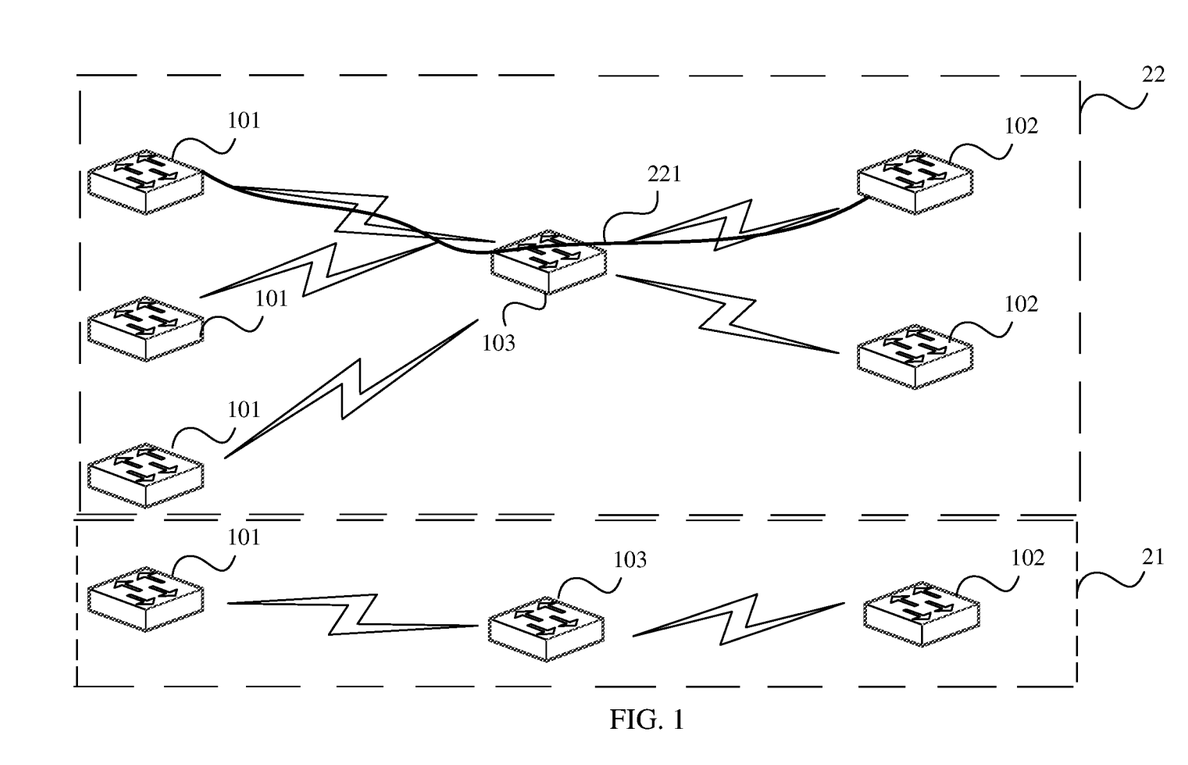
FIG. 1 is a schematic diagram of an application scenario of a communication system according to this application.

FIG. 1 is a schematic diagram of an application scenario of a communication system according to this application. The application scenario includes a plurality of source nodes 101, a plurality of sink nodes 102, and one or more transit nodes 103. The three types of nodes may be boards (also referred to as line cards) or devices used for communication, for example, Ethernet over OTN (EoO) boards or intermediate frequency boards. In embodiments of this application, specific quantities of the three types of nodes in the communication system are not limited. In FIG. 1, an example in which the communication system includes four source nodes, four sink nodes, and two transit nodes is merely used for description. The communication system includes one or more conventional bandwidth exclusive channels 21, and one or more bandwidth exclusive channels 22 that support statistical multiplexing of a data frame. To be distinguished from the conventional bandwidth exclusive channel, in embodiments of this application, the bandwidth exclusive channel that supports statistical multiplexing of a data frame is referred to as a preset bandwidth exclusive channel, and the preset bandwidth exclusive channel has higher bandwidth utilization than the conventional bandwidth exclusive channel. The preset bandwidth exclusive channel has a preset bandwidth exclusive channel number. The channel number is different from a channel number of the conventional bandwidth exclusive channel, and may be a channel number that is set by a user or allocated by a system. For example, the preset bandwidth exclusive channel number is 0×fff. As shown in FIG. 1, the preset bandwidth exclusive channel 22 includes a plurality of source nodes 101 and a plurality of sink nodes 102. In the preset bandwidth exclusive channel 22, each source node has a unique source node address, and each sink node has a unique sink node address. The source node 101 is configured to generate a data frame, and send the data frame to the sink node 102. The sink node 102 is configured to parse the received data frame. Optionally, the preset bandwidth exclusive channel further includes one or more transit nodes 103, where the transit node 103 is configured to forward, to the sink node 102, the data frame sent by the source node 101. For ease of description, in this embodiment of this application, a channel formed by each pair of source node and sink node in the preset bandwidth exclusive channel 22 is referred to as a soft pipe 221. Only one soft pipe is schematically marked in FIG. 1. There may be a plurality of soft pipes in the preset bandwidth exclusive channel, for example, eight soft pipes, and the plurality of soft pipes share a bandwidth of the preset bandwidth exclusive channel Data frames transmitted in different soft pipes that pass through a same transit node may be scheduled by the transit node, so as to implement statistical multiplexing of the soft pipes.

In an optional implementation scenario, the communication system may be an OTN, and the data frame transmitted on the bandwidth exclusive channel may be an OTN data frame, which is also referred to as an OTN frame or an OTN subframe. The OTN data frame carries service data in the OTN, and the OTN data frame may be an OSU (also referred to as an OSU cell) or an ODU, or may be another cell carrying service data. Optionally, a frame length of the OTN data frame is 178 bytes (bytes).

In another optional implementation scenario, the communication system is a microwave communication system, for example, a 5th generation mobile communication technology (5G) microwave system. The data frame transmitted on the bandwidth exclusive channel may be a microwave data frame (also referred to as a microwave data unit), for example, a sliced packet.

Figure 2:
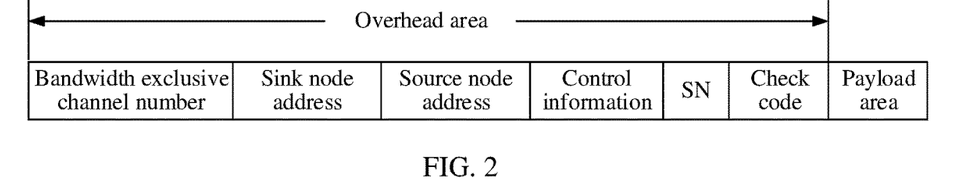
FIG. 2 is a schematic diagram of a structure of a data frame carrying a preset bandwidth exclusive channel number according to an embodiment of this application.

FIG. 2 is a schematic diagram of a structure of a data frame carrying a preset bandwidth exclusive channel number according to an embodiment of this application. For example, the data frame is an OSU or a sliced packet. The data frame includes an overhead area (also referred to as a cell header) and a payload area. The overhead area carries information describing the payload area. The payload area carries service data, for example, carries sliced service data. In an example, the overhead area of the data frame carries a preset bandwidth exclusive channel number, a source node address, a sink node address, and control information. The source node address and the sink node address remain unchanged in a transmission process of the data frame. The source node address identifies a source of the data frame, and the sink node address identifies a sending destination of the data frame. The control information includes scheduling information. For example, the scheduling information includes a transmission priority (also referred to as a scheduling priority) and/or a drop priority. The transmission priority indicates a sequence in which the data frame is scheduled by the transit node, and the drop priority indicates a sequence in which the data frame is dropped by the transit node. For example, the overhead area includes a source node address area, a sink node address area, and a control information area, and lengths of the source node address area, the sink node address area, and the control information area are each 2 bytes. The source node address area carries the source node address, the sink node address area carries the sink node address, and the control information area carries the control information. Optionally, the sink node address area may further include a reserved area. The reserved area carries reserved information, for example, one or more of sliced data of a simple service discovery protocol (SSDP), extended information of operation, administration and maintenance (OAM) information, multicast extended information, or other extended information.

The transit node maintains a data frame queue, and performs data frame scheduling based on the data frame queue. Optionally, the control information further includes preset congestion levels. In this way, in the communication system, no dedicated control message is needed to transmit the preset congestion levels, thereby reducing communication overheads. Different congestion levels in the control information correspond to different congestion degrees. The transit node may feed back, based on the preset congestion levels, a target congestion level of the data frame queue maintained by the transit node to an upstream node of the transit node.

Optionally, the data frame further includes operation and maintenance information for identifying a node that the data frame passes through and/or a hop count of a node that the data frame passes through during transmission. For example, the operation and maintenance information includes time to live (TTL). In an implementation, the TTL is for performing fault diagnosis and elimination on the data frame. For example, based on the TTL, fault diagnosis and elimination is performed on the data frame by using a ping command. In another implementation, the TTL is for tracking a routing status of the data frame. For example, each hop of node that the data frame passes through is triggered by using the TTL to feed back response information to a specified node (for example, a source node), and the specified node locates, based on the received response information, each hop of node that the data frame passes through.

In this embodiment of this application, in the preset bandwidth exclusive channel number, the data frame may further carry other information. As shown in FIG. 2, the data frame further includes a check code. For example, the check code is an algorithm such as a forward error correction (FEC) check code, a cyclic redundancy check (CRC) code, or a parity check code. The sink node may identify, through the check code, whether a bit error exists in the data frame. When the data frame is an OSU, compared with a conventional communication method, a bit error identification granularity can be refined, and bit error identification precision can be improved.

Optionally, if the payload area of the data frame carries sliced service data, the data frame further includes slice attribute information. The slice attribute information describes an attribute of the data frame. As shown in FIG. 2, the slice attribute information includes an SN (sequence number, sequence number). The SN is for sorting data frames from a same source node, so as to obtain service data by reassembly.

In practical implementation, a definition, a sequence, and/or a length of each piece of information in the payload area of the data frame may be adjusted based on an actual situation. The structure of the data frame shown in FIG. 2 is merely used as an example for description, and does not limit an actual structure of the data frame.

Figure 3:
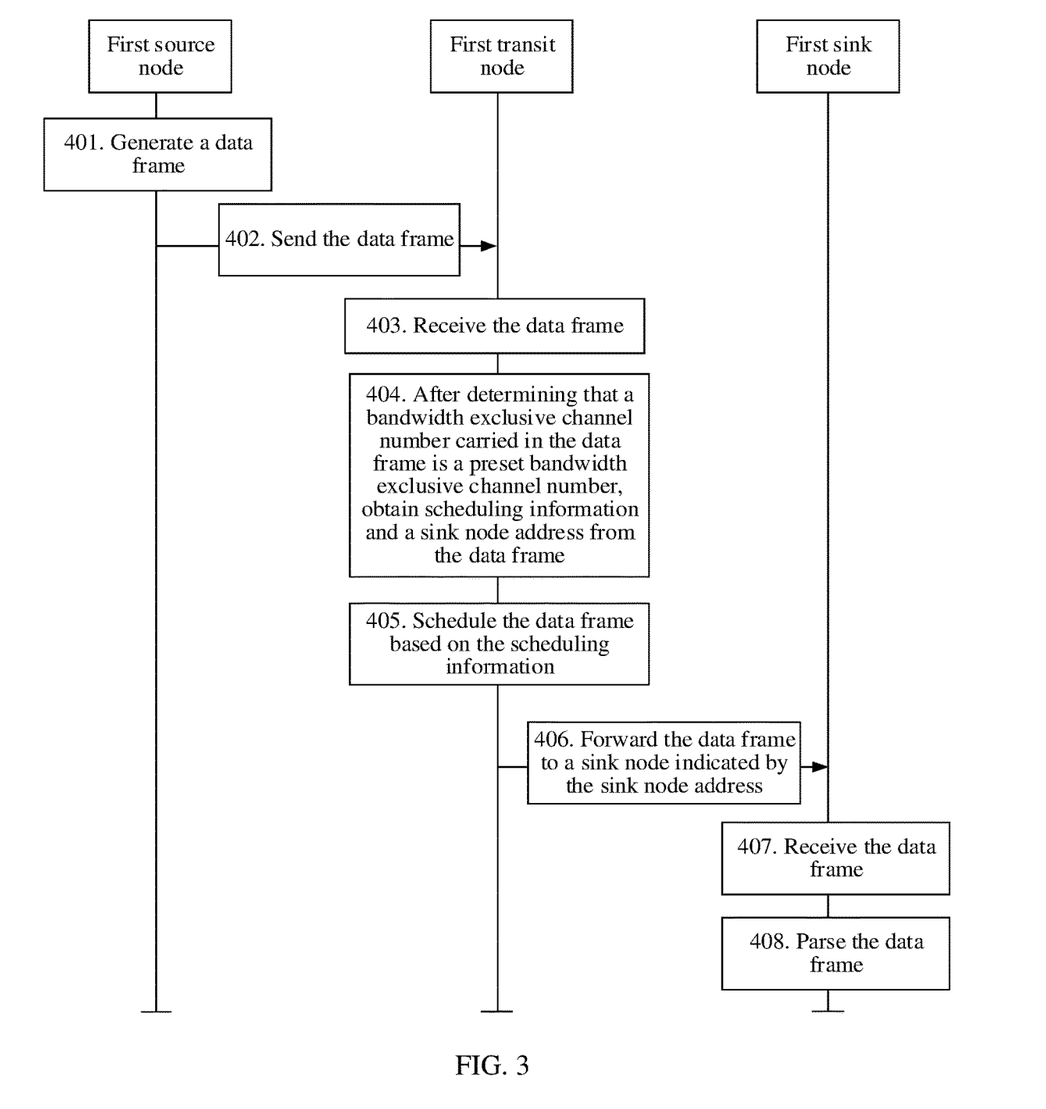
FIG. 3 is a schematic flowchart of a communication method according to an embodiment of this application.

FIG. 3 is a schematic flowchart of a communication method according to an embodiment of this application. The method is applied to a communication system. The communication system includes the one or more preset bandwidth exclusive channels shown in FIG. 1. Optionally, the communication system further includes one or more conventional bandwidth exclusive channels shown in FIG. 1. For each preset bandwidth exclusive channel shown in FIG. 1, communication procedures executed by the communication system are the same or similar. It is assumed that a preset bandwidth exclusive channel shown in FIG. 1 includes a plurality of source nodes and a plurality of sink nodes, and may further include one or more transit nodes. In this embodiment of this application, a working process of a first source node, a first transit node, and a first sink node in the preset bandwidth exclusive channel is used as an example for description. The first transit node is any transit node between the first source node and the first sink node. For a working process of another node in the preset bandwidth exclusive channel, refer to a working process of a corresponding node. The communication method includes the following steps.

S401. The first source node generates a data frame.

The data frame may be an OTN data frame or a microwave data frame. As shown in FIG. 2, the data frame includes a preset bandwidth exclusive channel number, a source node address of the first source node, a sink node address of the first sink node, and scheduling information. The data frame is used for a next-hop node of the first source node to schedule the data frame based on the scheduling information after determining that the data frame carries the preset bandwidth exclusive channel number, and forward the data frame to the first sink node indicated by the sink node address.

For example, when the data frame carries sliced service data (for example, the data frame is an OSU or a sliced packet), a process in which the first source node generates the data frame includes: The first source node slices service data, includes sliced service data in a payload area of the data frame, and then fills an overhead area of the data frame, so as to obtain the data frame. The obtained data frame may be shown in FIG. 2. The service data may be Ethernet frame data.

The service data is sliced for transmission, so that a granularity of the transmitted service data can be refined, thereby implementing fine-granularity transmission of the service data, and improving utilization of the bandwidth exclusive channel. For example, when the data frame is an OSU, a minimum granularity of the sliced service data may be 2 Mbit/s (megabit per second, also represented as Mbps).

S402. The first source node sends the data frame.

In actual implementation, the first source node sends the data frame to a next-hop node of the first source node. In FIG. 3, it is assumed that the next-hop node is the first transit node.

The first source node stores a correspondence between a sink node address and an outbound interface, where the outbound interface is an interface through which the data frame is sent. The first source node queries, by using the sink node address of the first sink node, the correspondence between the sink node address and the outbound interface, to obtain a target outbound interface corresponding to the sink node address of the first sink node. The first source node sends the data frame through the target outbound interface, so that the data frame is sent to the next-hop node of the first source node.

The preset bandwidth exclusive channel has an exclusive bandwidth. The first source node sends the data frame based on the exclusive bandwidth. For example, a quantity of data frames sent by the first source node in a unit time is less than the bandwidth of the preset bandwidth exclusive channel. There are a plurality of manners for the first source node to obtain the bandwidth of the preset bandwidth exclusive channel.

In a first manner, the first source node determines a sum of remaining bandwidths of other bandwidth exclusive channels as the bandwidth of the preset bandwidth exclusive channel. For example, the communication system includes a network management device. A user or an administrator inputs a bandwidth setting instruction by using the network management device, and configures bandwidths for other bandwidth exclusive channels according to the bandwidth setting instruction. The network management device sends the bandwidth setting instruction to the first source node. Correspondingly, the first source node receives the bandwidth setting instruction, so as to determine a bandwidth of each of the other bandwidth exclusive channels. Then, the sum of remaining bandwidths of the other bandwidth exclusive channels in the communication system is determined as the bandwidth of the preset bandwidth exclusive channel. The sum of the remaining bandwidths of the other bandwidth exclusive channels is a bandwidth other than bandwidths allocated to the other bandwidth exclusive channels.

For another example, the network management device directly determines the sum of the remaining bandwidths of the other bandwidth exclusive channels as the bandwidth of the preset bandwidth exclusive channel, and delivers the bandwidth to the first source node according to a bandwidth setting instruction. Correspondingly, the first source node receives the bandwidth setting instruction and learns of the bandwidth of the preset bandwidth exclusive channel.

The bandwidth of the preset bandwidth exclusive channel obtained in the first manner varies with different application scenarios. For example, if a bandwidth requirement of some of the other bandwidth exclusive channels increases, a part of the bandwidth of the preset bandwidth exclusive channel may be released and provided for the other bandwidth exclusive channels for use. For another example, if a bandwidth requirement of some of the other bandwidth exclusive channels decreases, a part of the bandwidths of the other bandwidth exclusive channels may be released and provided for the preset bandwidth exclusive channel for use. In this way, the bandwidth of the preset bandwidth exclusive channel is flexibly variable with high use flexibility. In addition, when the other bandwidth exclusive channels have a requirement for a large bandwidth, the bandwidths of the other bandwidth exclusive channels are preferentially satisfied, thereby ensuring a priority of a dedicated service carried by the other bandwidth exclusive channels.

In a second manner, the first source node receives a bandwidth setting instruction, and determines, according to the bandwidth setting instruction, the bandwidth of the preset bandwidth exclusive channel. For example, the first source node has or is connected to an input device. A user or an administrator inputs a bandwidth setting instruction by using the input device, and configures a bandwidth for the preset bandwidth exclusive channel according to the bandwidth setting instruction. Correspondingly, the first source node receives the bandwidth setting instruction and learns of the bandwidth of the preset bandwidth exclusive channel.

For another example, the communication system includes a network management device. A user or an administrator inputs a bandwidth setting instruction by using the network management device, and configures a bandwidth for the preset bandwidth exclusive channel through the bandwidth setting instruction. The network management device sends the bandwidth setting instruction to the first source node. Correspondingly, the first source node receives the bandwidth setting instruction and learns of the bandwidth of the preset bandwidth exclusive channel.

S403. The first transit node receives the data frame.

The first transit node receives the data frame sent by a previous-hop node of the first transit node. When the first transit node is a transit node between one or more pairs of source nodes and sink nodes in the preset bandwidth exclusive channel, the previous-hop node may be a transit node or a source node of the preset bandwidth exclusive channel. When the first transit node is a transit node between the source node and the sink node in the one or more conventional bandwidth exclusive channels (the bandwidth exclusive channels shown in FIG. 1), the previous-hop node may be a transit node or a source node of the conventional bandwidth exclusive channel.

S404. After determining that a bandwidth exclusive channel number carried in the data frame is the preset bandwidth exclusive channel number, the first transit node obtains the scheduling information and the sink node address from the data frame.

In different data frame transmission scenarios, the first transit node may receive data frames sent by different previous-hop nodes, and the different data frames each include a bandwidth exclusive channel number. Therefore, for a data frame from the conventional bandwidth exclusive channel, the first transit node determines that the bandwidth exclusive channel number carried in the data frame is a common bandwidth exclusive channel number, and the data frame is sent in a cross-connection manner.

For a data frame from the preset bandwidth exclusive channel, the first transit node determines that the bandwidth exclusive channel number carried in the data frame is the preset bandwidth exclusive channel number, and obtains the scheduling information and the sink node address from the data frame. The scheduling information is for scheduling the data frame, and the sink node address is for forwarding the data frame. In subsequent S405 and S406, it is assumed that the first transit node determines that the bandwidth exclusive channel number carried in the data frame is the preset bandwidth exclusive channel number.

S405. The first transit node schedules the data frame based on the scheduling information.

For the preset bandwidth exclusive channel, the first transit node maintains a data frame queue, and the first transit node schedules the data frame based on the data frame queue and the scheduling information. It should be noted that a proper buffer needs to be pre-configured for the data frame queue maintained by the first transit node, and the buffer is configured to absorb a large quantity of data frames in an instantaneous burst. Optionally, the buffer is further configured to support a subsequent drop algorithm for dropping a data frame based on a drop priority.

As shown in FIG. 2, the scheduling information includes a transmission priority. The first transit node sends data frames in descending order of transmission priorities of the data frames in the data frame queue. Optionally, the first transit node extracts data frames from the data frame queue in descending order of transmission priorities and sends the data frames, or the first transit node adds data frames to the data frame queue in descending order of transmission priorities. In this way, the transmission priority describes a sequence of scheduling the data frame queue by the first transit node, and is also referred to as a queue priority.

As shown in FIG. 2, the scheduling information includes a drop priority. When the data frame queue is congested, the first transit node drops data frames in descending order of drop priorities of the data frames, thereby reducing a congestion degree of the data frame queue.

As shown in FIG. 2, the data frame further includes preset congestion levels, and different congestion levels correspond to different congestion degrees. If a congestion degree of the data frame queue of the transit node reaches a target congestion level in the preset congestion levels (the target congestion level is a current congestion level of the first transit node), the first transit node may drop data frames based on the target congestion level and drop priorities of the data frames in the data frame queue. For example, the first transit node may determine, based on the target congestion level, a quantity of dropped data frames. A more severe congestion level indicates more dropped data frames. For example, the first transit node queries, based on the target congestion level, a correspondence between a congestion level and a drop quantity, to obtain a target drop quantity, and drops a target drop quantity of data frames in ascending order of drop priorities. In this way, on a premise of ensuring that congestion is reduced, dropping of a data frame with a high drop priority is reduced as much as possible.

For example, a process in which the first transit node determines the target congestion level includes: The first transit node may calculate a difference between a transmission bandwidth (namely, a quantity of data frames transmitted in unit duration) corresponding to the data frame and the bandwidth of the preset bandwidth exclusive channel, and query a correspondence between a congestion level and a difference range by using an obtained target difference. A congestion level corresponding to a difference range to which the target difference belongs as the target congestion level.

It should be noted that, in different data frame transmission scenarios, the congestion level carried in the data frame is divided in different manners, and the first transit node maintains correspondences between a plurality of groups of congestion levels corresponding to a plurality of division manners and a difference range. For congestion levels in different division manners, correspondences between a congestion level selected by the first transit node and a difference range are different. For example, there are two congestion levels carried in the data frame, which are respectively represented by 0 and 1, where 0 indicates congestion, and 1 indicates non-congestion. In this case, a division manner of congestion levels is a dichotomy (the division manner may be carried in the data frame, or may be determined by the first transit node based on a quantity of congestion levels carried in the data frame). The first transit node determines the target congestion level by using a correspondence between a group of congestion levels corresponding to the dichotomy and a difference range. For example, if a difference between the transmission bandwidth corresponding to the data frame and the bandwidth of the preset bandwidth exclusive channel is less than or equal to 0, the target congestion level is determined as 1; and if the difference between the transmission bandwidth corresponding to the data frame and the bandwidth of the preset bandwidth exclusive channel is greater than 0, the target congestion level is determined as 0.

In this embodiment of this application, the transit node may further perform flow control and backpressure based on the obtained congestion level. The flow control and backpressure refers to traffic control of data frames through feedback. A process of the flow control and backpressure includes:

If the congestion degree of the data frame queue of the transit node reaches the target congestion level in the preset congestion levels, the first transit node sends the target congestion level to an upstream node of the first transit node, where the target congestion level is used for the upstream node to control a quantity of sent data frames. For example, the quantity of the sent data frames is maintained or reduced. The foregoing two congestion levels 0 and 1 are still used as an example. When the target congestion level received by the upstream node is 0, the upstream node reduces the quantity of sent data frames; and when the target congestion level received by the upstream node is 1, the upstream node maintains the quantity of sent data frames.

In a first optional manner, the upstream node of the first transit node is a previous-hop node of the first transit node. The first transit node feeds back the target congestion level to the previous-hop node, and then the previous-hop node feeds back the target congestion level to a previous-hop node of the previous-hop node until the target congestion level is fed back to a source node, thereby implementing hop-by-hop forward feedback of the target congestion level. When the target congestion level indicates that congestion occurs on the first transit node, each node that receives the target congestion level may reduce, based on the target congestion level, a quantity of sent data frames, so as to reduce a quantity of data frames arriving at the first transit node, thereby reducing the congestion degree of the data frame queue of the first transit node.

In a second optional manner, the upstream node of the first transit node is a source node, and the first transit node directly feeds back the target congestion level to the source node. When the target congestion level indicates that congestion occurs on the first transit node, the source node may reduce, based on the target congestion level, a quantity of sent data frames, so as to reduce a quantity of data frames arriving at the first transit node, thereby reducing the congestion degree of the data frame queue of the first transit node.

Compared with the second optional manner, the first optional manner has a smaller delay in reducing the congestion level, but each node between the first transit node and the source node needs to react, and the process of performing the flow control and backpressure is complex. In the second optional manner, because the source node directly reduces a quantity of the data frames at the source, the process of performing the flow control and backpressure is simpler.

In this embodiment of this application, the upstream node may determine a quantity of dropped data frames based on the target congestion level of the first transit node. A more severe congestion level indicates more dropped data frames. For example, the upstream node queries, based on the target congestion level, a correspondence between a congestion level and a drop quantity, to obtain a target drop quantity, and drops a target drop quantity of data frames. If the data frame carries the drop priority, the upstream node drops data frames in ascending order of drop priorities. In this way, on a premise of ensuring that congestion is reduced, dropping of a data frame with a high drop priority is reduced as much as possible.

In a related technology, the preset congestion levels are carried in independent control information, and transmission of the control information needs to occupy an additional bandwidth. In this embodiment of this application, the preset congestion levels are directly carried in the data frame, so as to reduce occupation of an additional bandwidth. In addition, the transit node may feed back the target congestion level based on the preset congestion levels, so that the transit node on a forwarding path of the data frame responds in time, and use flexibility of the data frame is improved.

The preset bandwidth exclusive channel has an exclusive bandwidth. The first transit node schedules the data frame based on the exclusive bandwidth. For example, a quantity of data frames sent by the first transit node in a unit time is less than the bandwidth of the preset bandwidth exclusive channel. For a manner in which the first transit node obtains the bandwidth of the preset bandwidth exclusive channel, refer to the manner in which the first source node obtains the bandwidth of the preset bandwidth exclusive channel in S402. Details are not described again in this embodiment of this application.

S406: The first transit node forwards the data frame to a sink node indicated by the sink node address.

The first transit node sends the data frame to a next-hop node of the first transit node, so that the next-hop node forwards the data frame to the sink node indicated by the sink node address. In FIG. 3, it is assumed that the next-hop node is the first sink node.

The first transit node stores a correspondence between a sink node address and an outbound interface. It is assumed that the sink node address carried in the data frame is the sink node address of the first sink node. The first transit node queries the correspondence between a sink node address and an outbound interface by using the sink node address of the first sink node, to obtain a target outbound interface corresponding to the sink node address of the first sink node; and the first transit node sends a scheduled data frame through the target outbound interface. For example, the scheduled data frame refers to a data frame that is sorted based on a transmission priority, or a data frame that is updated based on a drop priority.

It should be noted that, when the data frame is an OSU, after being encapsulated in the OSU, the service data is encapsulated in the ODU and transmitted through a specified slot. The outbound interface in S402 and S406 may be represented by an identifier and a slot number of the ODU. That the first transit node sends the scheduled data frame through the target outbound interface means that the first transit node encapsulates a scheduled OSU in an ODU corresponding to the target outbound interface, and sends the ODU through a slot corresponding to the target outbound interface.

When the communication system is a microwave communication system, and the data frame is a microwave data frame, for example, a sliced packet, the service data is encapsulated in the microwave data frame and then transmitted through a specified air interface. The outbound interface in S402 and S406 may be represented by an air interface number. That the first transit node sends the scheduled data frame through the target outbound interface means that the first transit node sends the scheduled microwave data frame through an air interface corresponding to the target outbound interface.

S407. The first sink node receives the data frame.

The first sink node receives the data frame sent by a previous-hop node of the first sink node. When the first sink node is a sink node in the preset bandwidth exclusive channel, the previous-hop node may be a transit node or a source node of the preset bandwidth exclusive channel.

The preset bandwidth exclusive channel has an exclusive bandwidth. The first sink node receives the data frame based on the exclusive bandwidth. For example, a quantity of data frames received by the first sink node in a unit time is less than the bandwidth of the preset bandwidth exclusive channel. For a manner in which the first sink node obtains the bandwidth of the preset bandwidth exclusive channel, refer to the manner in which the first source node obtains the bandwidth of the preset bandwidth exclusive channel in S402. Details are not described again in this embodiment of this application.

S408: The first sink node parses the data frame.

In the preset bandwidth exclusive channel, because there may be a plurality of source nodes, data frames received by the first sink node may come from different source nodes. In this case, the first sink node needs to separately parse the data frames from the different source nodes. For example, a parsing process includes: The first sink node allocates a packetizer to a received data frame, where different packetizers in the packetizers allocated by the first sink node correspond to different source node addresses; and the first sink node parses data frames from a same source node address by using the allocated packetizer. Referring to S401, the payload area of the data frame carries sliced service data, that is, the data frame transmits sliced data of the service data. In this case, the packetizer needs to reassemble the sliced data to obtain complete service data. In this case, the first sink node reassembles data frames from a same source node address by using the allocated packetizer, to obtain service data. For example, as shown in FIG. 2, the data frame may further carry an SN. The first sink node sorts, based on the SN, data frames from a same source node, so as to obtain service data through reassembly.

It should be noted that, in S402, the first source node stores the correspondence between a sink node address and an outbound interface. In S406, the first transit node stores the correspondence between a sink node address and an outbound interface. The correspondence may be stored in a form of a routing table (or a forwarding table). The routing table supports dynamic protocol configuration or static configuration. For example, the routing table may be pre-delivered by the network management device to each node of the preset bandwidth exclusive channel.

To sum up, in embodiments of this application, the transit node may schedule different data frames in the bandwidth exclusive channel indicated by the preset bandwidth exclusive channel number based on the scheduling information. Data frames are transmitted between different source nodes and different sink nodes in a same bandwidth exclusive channel, so that the bandwidth exclusive channel supports statistical multiplexing. This improves bandwidth utilization of the bandwidth exclusive channel.

Figure 4:
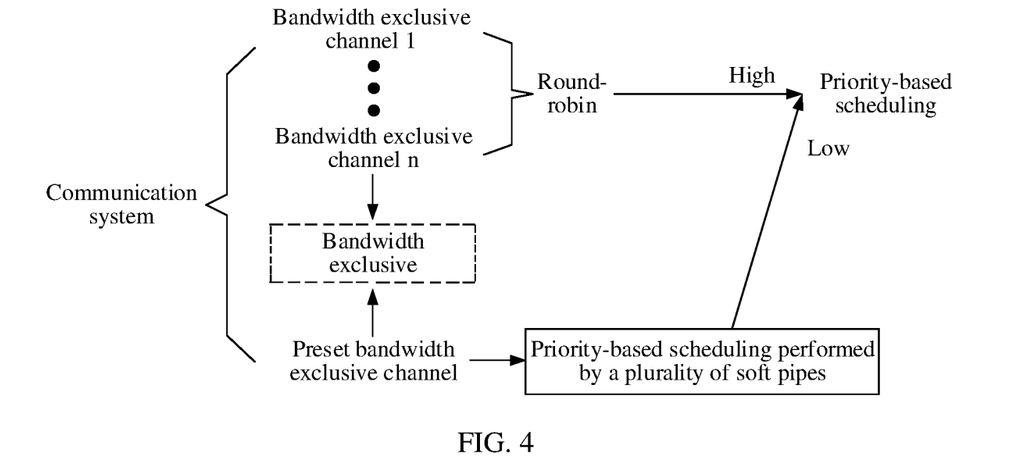
FIG. 4 is a schematic diagram of an architecture and a principle of a communication system according to an embodiment of this application.

FIG. 4 is a schematic diagram of an architecture and a principle of a communication system according to an embodiment of this application. The communication system related to the communication method provided in embodiments of this application includes one or more conventional bandwidth exclusive channels, and further includes the foregoing preset bandwidth exclusive channel. The conventional bandwidth exclusive channel and the preset bandwidth exclusive channel are compatible with each other, and a bandwidth of the preset bandwidth exclusive channel can be flexibly allocated. FIG. 4 is described by using an example in which the communication system can support a maximum of 4095 conventional bandwidth exclusive channels and support one preset bandwidth exclusive channel. In FIG. 4, it is assumed that the communication system includes n conventional bandwidth exclusive channels, which are bandwidth exclusive channels 1 to n, for transmitting low-delay data frames or normal-delay data frames. In the communication system, both the conventional bandwidth exclusive channel and the preset bandwidth exclusive channel have an exclusive bandwidth, and the bandwidth exclusive channels are completely isolated from each other without affecting each other. In the preset bandwidth exclusive channel, there are a plurality of soft pipes, and each of the soft pipes may transmit a normal-delay data frame. The plurality of soft pipes support priority-based scheduling, thereby implementing statistical multiplexing of the soft pipes, and improving bandwidth utilization of the bandwidth exclusive channel. In this case, priority-based scheduling means to perform scheduling, based on the foregoing scheduling information, data frames transmitted in the soft pipes. A quality requirement on service data transmitted in the preset bandwidth exclusive channel may be lower than a quality requirement on service data transmitted in the conventional bandwidth exclusive channel. In the preset bandwidth exclusive channel, service data having a low quality requirement can share a bandwidth, and a data frame with a high transmission priority can be preferentially transmitted in a congestion scenario by scheduling data frames. In this way, a requirement on full connection of the Internet of Things can be satisfied.

It should be noted that none of data frames transmitted in the bandwidth exclusive channels 1 to n carries scheduling information because no congestion occurs. In this way, when the data frames in the bandwidth exclusive channels 1 to n are scheduled, the scheduling information is not considered, and the scheduling is generally performed in a round-robin (Round-Robin, RR) manner. In actual implementation, if data frames from the conventional bandwidth exclusive channel and the preset bandwidth exclusive channel need to be scheduled, scheduling may be performed in a priority-based scheduling manner. In this case, the priority-based scheduling means performing scheduling in a manner in which a priority of the conventional bandwidth exclusive channel is higher than a priority of the preset bandwidth exclusive channel.

A sequence of the steps of the communication method provided in embodiments of this application may be properly adjusted, and a step may also be correspondingly added or deleted based on a situation. Any modified method that can be easily figured out by a person skilled in the art within the technical scope disclosed in this application shall fall within the protection scope of this application. Details are not described herein. In addition, advantageous effects of the apparatus embodiment are similar to advantageous effects of the steps corresponding to the method, and details are not described below again.

Figure 5:
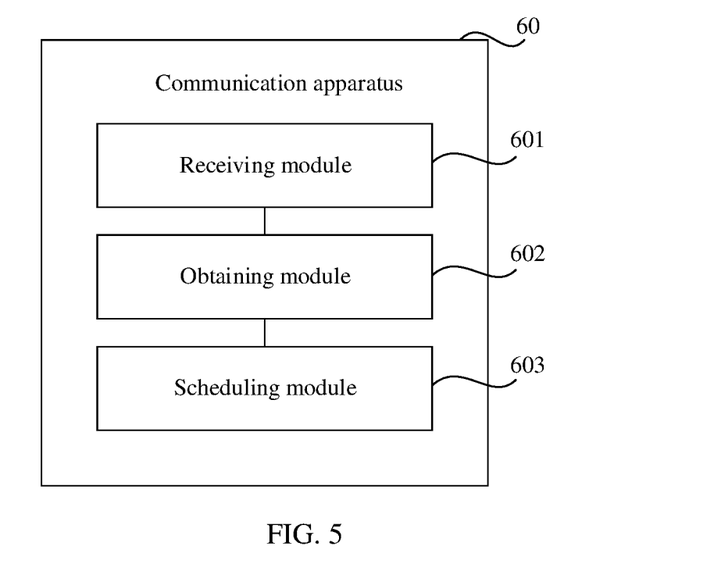
FIG. 5 is a schematic diagram of a structure of a communication apparatus 60 according to an embodiment of this application.

FIG. 5 is a schematic diagram of a structure of a communication apparatus 60 according to an embodiment of this application. The apparatus 60 is used in a transit node of a communication system. The apparatus includes a receiving module 601, an obtaining module 602, and a scheduling module 603.

The receiving module 601 is configured to receive an optical transport network OTN data frame, where the OTN data frame includes a bandwidth exclusive channel number. The obtaining module 602 is configured to, when the bandwidth exclusive channel number carried in the OTN data frame is a preset bandwidth exclusive channel number, obtain scheduling information and a sink node address from the OTN data frame. The scheduling module 603 is configured to schedule the OTN data frame based on the scheduling information, and forward the OTN data frame to a sink node indicated by the sink node address. For example, the scheduling information includes a transmission priority and/or a drop priority.

Optionally, the scheduling module 603 is configured to: query a correspondence between the sink node address and an outbound interface, to obtain a target outbound interface corresponding to the sink node address carried in the OTN data frame; and send the scheduled OTN data frame from the target outbound interface.

In an optional example, when the OTN data frame includes the preset bandwidth exclusive channel number, the OTN data frame further includes preset congestion levels, and the apparatus further includes a sending module. The sending module is configured to: in a scheduling process, if a congestion degree of an OTN data frame queue reaches a target congestion level in the preset congestion levels, send the target congestion level to an upstream node of the transit node, where the target congestion level is used for the upstream node to reduce a quantity of sent OTN data frames.

In another optional example, when the OTN data frame includes the preset bandwidth exclusive channel number, the OTN data frame further includes operation and maintenance information, used for identifying a node that the OTN data frame passes through and/or a hop count of a node that the OTN data frame passes through during transmission.

Optionally, the apparatus further includes a bandwidth determining module, configured to obtain a bandwidth of the preset bandwidth exclusive channel. For a specific obtaining manner, refer to the two manners provided in S402. Details are not described herein again.

For example, the OTN data frame is an OSU or a sliced packet. When the OTN data frame includes the preset bandwidth exclusive channel number, an overhead area of the OTN data frame carries the bandwidth exclusive channel number, a source node address, the sink node address, and the scheduling information, and a payload area of the OTN data frame carries sliced service data.

Figure 6:
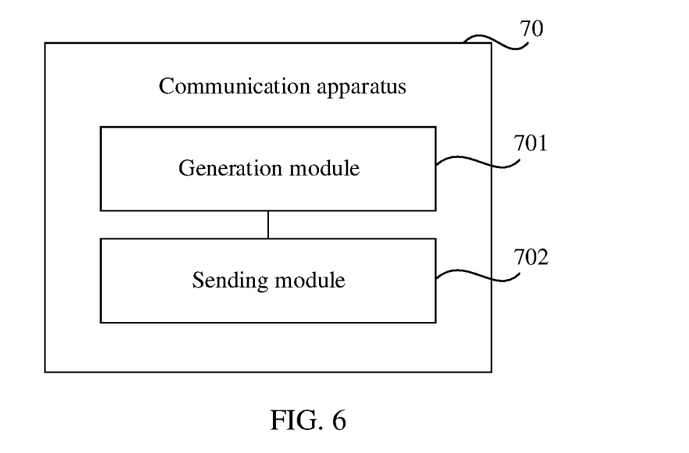
FIG. 6 is a schematic diagram of a structure of another communication apparatus 70 according to an embodiment of this application.

FIG. 6 is a schematic diagram of a structure of another communication apparatus 70 according to an embodiment of this application. The apparatus 70 is used in a source node of a communication system, and the apparatus includes a generation module 701 and a sending module 702.

The generation module 701 is configured to generate an optical transport network OTN data frame. The OTN data frame includes a preset bandwidth exclusive channel number, a sink node address, and scheduling information. The OTN data frame is used for a next-hop node of the source node to schedule the OTN data frame based on the scheduling information after determining that the OTN data frame carries the preset bandwidth exclusive channel number, and forward the OTN data frame to a sink node indicated by the sink node address. The sending module 702 is configured to send the OTN data frame. Optionally, the data frame further includes a source node address of the source node.

Figure 7:
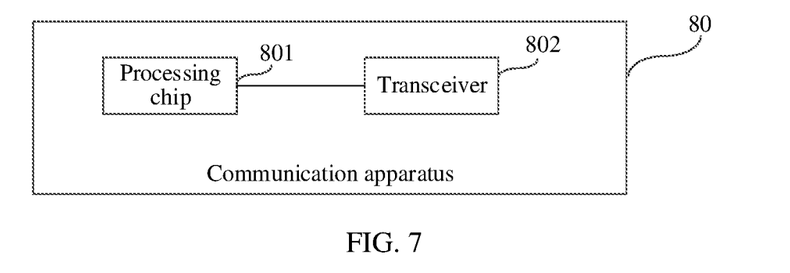
FIG. 7 is a schematic diagram of a structure of still another communication apparatus 80 according to an embodiment of this application.

FIG. 7 is a schematic diagram of a structure of still another communication apparatus 80 according to an embodiment of this application. As shown in FIG. 7, the communication apparatus 80 includes a processing chip 801 and a transceiver (TRX) 802.

The communication apparatus 80 shown in FIG. 7 may be used in a transit node of a communication system, and the processing chip 801 is configured to perform the communication method performed by the transit node in the foregoing embodiment of this application. The communication apparatus 80 shown in FIG. 7 may alternatively be used in a source node of a communication system, and the processing chip 801 is configured to perform the communication method performed by the source node in the foregoing embodiment of this application. The processing chip 801 may be a field programmable gate array (FPGA) or an integrated circuit (ASIC) chip. The transceiver 802 is configured for the processing chip 801 to communicate with another apparatus. For example, the transceiver 802 is an optical transceiver, and is configured for the processing chip 801 to communicate with a sink node by using an optical fiber.

In an optional implementation, the processing chip 801 includes a buffer structure, for example, an FPGA or a storage structure inside an ASIC chip, and is configured to buffer a correspondence between a sink node address and an outbound interface. In another optional implementation, the processing chip 801 further includes a memory, configured to buffer a correspondence between a sink node address and an outbound interface. For example, the memory is a flash memory.

An embodiment of this application provides a communication system. The communication system includes a plurality of source nodes, a transit node, and a plurality of sink nodes. The transit node includes the communication apparatus 60 provided in the foregoing embodiment, and the source nodes include the communication apparatus 70 provided in the foregoing embodiment. Alternatively, the transit node includes the communication apparatus 80 provided in the foregoing embodiment, and the source nodes include the communication apparatus 80 provided in the foregoing embodiment. The communication system includes the preset bandwidth exclusive channel shown in FIG. 1, and may further include the conventional bandwidth exclusive channel shown in FIG. 1.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and "third" are merely used for a purpose of description, and shall not be understood as an indication or implication of relative importance. The term "at least one" means one or more, and the term "a plurality of" means two or more, unless otherwise expressly limited. That A refers to B means that A is the same as B or A is a simple variant of B.

It should be noted that, when the communication apparatuses provided in the foregoing embodiments perform the communication method, division into the foregoing functional modules is merely used as an example for description. During actual application, the foregoing functions may be allocated to different functional modules for implementation as required. That is, an internal structure of a device is divided into different functional modules, to implement all or some of the functions described above. In addition, the communication apparatuses provided in the foregoing embodiments and the communication method embodiment pertain to a same concept. For a specific implementation process, refer to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A communication method, performed at a transit node of a communication system, wherein the method comprises:
   receiving a data frame, wherein
      the data frame comprises a bandwidth exclusive channel number, and
      the data frame is an optical transport network (OTN) data frame or a microwave data frame;
   in response to the bandwidth exclusive channel number carried in the data frame being a preset bandwidth exclusive channel number, obtaining scheduling information and a sink node address from the data frame;
   scheduling the data frame based on the scheduling information; and
   forwarding the scheduled data frame to a sink node indicated by the sink node address,
   wherein the preset bandwidth exclusive channel number indicates a preset bandwidth exclusive channel that comprises a plurality of soft pipes.

2. The method according to claim 1, wherein the forwarding the scheduled data frame comprises:
   querying a correspondence between the sink node address and an outbound interface, to obtain a target outbound interface corresponding to the sink node address carried in the data frame; and
   sending the scheduled data frame through the target outbound interface.

3. The method according to claim 1, wherein the scheduling information comprises at least one of a transmission priority or a drop priority.

4. The method according to claim 1, wherein
   the data frame comprises:
      the preset bandwidth exclusive channel number, and
      preset congestion levels; and the method further comprises:
in response to a congestion degree of a data frame queue of the transit node reaching a target congestion level in the preset congestion levels,
sending, to an upstream node of the transit node, the target congestion level to be used at the upstream node to control a quantity of sent data frames.

5. The method according to claim 1, further comprising:
determining a sum of remaining bandwidths of other bandwidth exclusive channels as a bandwidth of the preset bandwidth exclusive channel indicated by the preset bandwidth exclusive channel number.

6. The method according to claim 1, further comprising:
receiving a bandwidth setting instruction; and
determining, based on the bandwidth setting instruction, a bandwidth of the preset bandwidth exclusive channel indicated by the preset bandwidth exclusive channel number.

7. The method according to claim 1, wherein
the data frame comprises:
the preset bandwidth exclusive channel number, and
operation and maintenance information for identifying at least one of a node that the data frame passes through or a hop count of a node that the data frame passes through during transmission.

8. The method according to claim 1, wherein
the data frame comprises the preset bandwidth exclusive channel number,
an overhead area of the data frame carries the bandwidth exclusive channel number, a source node address, the sink node address, and the scheduling information, and
a payload area of the data frame carries sliced service data.

9. The method according to claim 1, wherein
the plurality of soft pipes share a bandwidth of the preset bandwidth exclusive channel.

10. The method according to claim 1, wherein
the communication system comprises the preset bandwidth exclusive channel, and a plurality of other bandwidth exclusive channels, and
a quality requirement on service data transmitted in the preset bandwidth exclusive channel is lower than a quality requirement on service data transmitted in the other bandwidth exclusive channels.

11. The method according to claim 1, further comprising:
transmitting data frames between different source nodes and different sink nodes in the preset bandwidth exclusive channel,
wherein each soft pipe of the plurality of soft pipes forms a channel between a source node among the different source nodes and a sink node among the different sink nodes.

12. A communication method, performed at a source node of a communication system, wherein the method comprises:
generating a data frame, wherein
the data frame is an optical transport network (OTN) data frame or a microwave data frame,
the data frame comprises a preset bandwidth exclusive channel number, a sink node address, and scheduling information; and
sending the data frame to be used at a next-hop node of the source node to
in response to determining that the data frame carries the preset bandwidth exclusive channel number, schedule the data frame based on the scheduling information, and
forward the scheduled data frame to a sink node indicated by the sink node address,
wherein the preset bandwidth exclusive channel number indicates a preset bandwidth exclusive channel that comprises a plurality of soft pipes.

13. A communication apparatus, configured as a transit node of a communication system, wherein the apparatus comprises:
a processing chip; and
a transceiver configured for the processing chip to communicate with another apparatus, and
the processing chip is configured to:
receive, via the transceiver, a data frame, wherein
the data frame comprises a bandwidth exclusive channel number, and
the data frame is an optical transport network (OTN) data frame or a microwave data frame;
in response to the bandwidth exclusive channel number carried in the data frame being a preset bandwidth exclusive channel number, obtain scheduling information and a sink node address from the data frame;
schedule the data frame based on the scheduling information; and
forward, via the transceiver, the scheduled data frame to a sink node indicated by the sink node address,
wherein the preset bandwidth exclusive channel number indicates a preset bandwidth exclusive channel that comprises a plurality of soft pipes.

14. The communication apparatus according to claim 13, wherein, to forward the scheduled data frame, the processing chip is configured to:
query a correspondence between the sink node address and an outbound interface, to obtain a target outbound interface corresponding to the sink node address carried in the data frame; and
send, via the transceiver, the scheduled data frame through the target outbound interface.

15. The communication apparatus according to claim 13, wherein the scheduling information comprises at least one of a transmission priority or a drop priority.

16. The communication apparatus according to claim 13, wherein
the data frame comprises:
the preset bandwidth exclusive channel number, and
preset congestion levels; and
the processing chip is further configured to:
in response to a congestion degree of a data frame queue of the transit node reaching a target congestion level in the preset congestion levels,
send, via the transceiver and to an upstream node of the transit node, the target congestion level to be used at the upstream node to control a quantity of sent data frames.

17. The communication apparatus according to claim 13, the processing chip is further configured to:
determine a sum of remaining bandwidths of other bandwidth exclusive channels as a bandwidth of the preset bandwidth exclusive channel indicated by the preset bandwidth exclusive channel number.

18. The communication apparatus according to claim 13, the processing chip is further configured to:
receive a bandwidth setting instruction; and
determine, based on the bandwidth setting instruction, a bandwidth of the preset bandwidth exclusive channel indicated by the preset bandwidth exclusive channel number.

19. The communication apparatus according to claim 13, wherein
the data frame comprises:
the preset bandwidth exclusive channel number, and
operation and maintenance information for identifying at least one of a node that the data frame passes through or a hop count of a node that the data frame passes through during transmission.

20. The communication apparatus according to claim 13, wherein
the data frame comprises the preset bandwidth exclusive channel number,
an overhead area of the data frame carries the bandwidth exclusive channel number, a source node address, the sink node address, and the scheduling information, and
a payload area of the data frame carries sliced service data.

* * * * *